United States Patent
Avelange et al.

[11] Patent Number: 5,404,414
[45] Date of Patent: Apr. 4, 1995

[54] OPTICAL COUPLER WITH HIGH DEGREE OF ISOLATION

[75] Inventors: Gerome Avelange, Barbizon; Philippe Lamache, Paris, both of France

[73] Assignee: Thomson Hybrides, Puteaux, France

[21] Appl. No.: 27,096

[22] Filed: Mar. 5, 1993

[30] Foreign Application Priority Data

Mar. 6, 1992 [FR] France .................. 92 02722

[51] Int. Cl.⁶ .............................................. G02B 6/32
[52] U.S. Cl. .......................................... 385/34; 385/36; 385/47
[58] Field of Search ................ 385/31, 33, 34, 36, 385/38, 44, 47, 48

[56] References Cited

U.S. PATENT DOCUMENTS

| 4,412,720 | 11/1983 | Costa | 385/36 X |
| 5,146,516 | 9/1992 | Blümke et al. | 385/36 |

FOREIGN PATENT DOCUMENTS

| 0105177 | 4/1984 | European Pat. Off. |
| 0378368 | 7/1990 | European Pat. Off. |
| 2586305 | 2/1987 | France |
| 3546082 | 5/1987 | Germany |

OTHER PUBLICATIONS

Patent Abstracts of Japan, vol. 9, No. 304 (P-409), Nov. 30, 1985 & JP-A-60 138 506 Jul. 1985, S. Katagiri, "Photodetecting Element Module."
Journal of Electronic Engineering, No. 236, Aug. 23, 1986, pp. 46–49 N. Kurata, "Present Development of Optical . . ."

*Primary Examiner*—John D. Lee
*Attorney, Agent, or Firm*—Oblon, Spivak, McClelland, Maier & Neustadt

[57] ABSTRACT

An optical coupler comprises at least one optical fiber (1), one laser (2), one photodiode (3), one focusing lens (30) for focusing on the fiber and one plate (41) which reflects the rays coming from the fiber (1) towards the photodiode (3). In order to prevent a ray sent out by the laser (2) from returning to the photodiode (3) after reflection on the input diopter (4) of the lens (30), the optical axis is broken at the height of this diopter (4) by means of a prism (5). The reflected rays do not return to the plate (41).

12 Claims, 1 Drawing Sheet

OPTICAL COUPLER WITH HIGH DEGREE OF ISOLATION

BACKGROUND OF THE INVENTION

1. Field of the Invention

The present invention relates to an optical head, capable of being integrated, of the optical coupler type working in transmission and reception at one and the same light wavelength that is conveyed by an optical fiber. This optical coupler, which is designed so that it can be directly integrated into the subtrate of a hybrid circuit, is noteworthy for the high degree of isolation between its two channels.

In the basic scheme of a system for the exchange of data by optical fiber, a single optical fiber connects two laser diode/photodiode sets, each located at one end of the optic fiber: in a first direction of exchange, the information elements sent out in the form of light pulses by a laser at first end are detected by a photodiode at a second end, and conversely in a second direction of exchange. The lasers can also be replaced by light-emitting diodes or LEDs.

When there is only one optical fiber for two communications channels, two systems have to be placed at the ends of the fiber: these systems are called couplers because they couple the laser and the photodiode to the fiber.

2. Description of the Prior Art

There are many known types of couplers, based on different principles, but it has appeared to be worthwhile that they can be integrated into the substrate of a hybrid circuit. The U.S. Pat. No. 5,123,067 by the present Applicant, describes an optical head with two dimensions (taken in the plane of a receiver hybrid circuit) in which the thickness of the semiconductor chips, lenses and optical fiber is considered to be negligible, this thickness being, in any case, of the same order of magnitude as the thickness of the components fixed to the hybrid circuit.

One drawback of optical couplers is related to the very great difference between the level of light energy sent out by the laser and the level of energy received by the photodiode. As a rule, in telecommunications, the distance between two couplers ranges from 1 to 25 kilometers, which considerably attenuates the light energy emitted by a laser, because it is absorbed in the core of the optical fiber. Even if the data exchange system is used with a small length of optical fiber, it is nevertheless a fact that, by virtue of the reversibility of the optical paths, a light ray sent out by the laser of a coupler can get partially reflected, on one of the many couplers of the diopter and to return to the detection photodiode of this same coupler. There is therefore poor isolation between the channels, giving rise to the equivalent of telephonic cross-talk, and a coupler detects a part of the signals that it sends out in parasite form.

The object of the invention is therefore an optoelectronic device, of the optical head or optical coupler type, comprising a light transmitter component and a light receiver component, this device having a structure and an organization such that the parasitic light rays which get reflected on the different diopters existing in the device do not travel on the same optical path as the incident rays, thus leading to a high degree of isolation between the transmission and reception channels. According to this structure, the detector component is no longer subjected to parasitic dazzling from the transmitter component that it neighbors in the same coupler.

SUMMARY OF THE INVENTION

More specifically, the invention relates to an optical coupler with a high degree of isolation, comprising a transmitter device to send out a light radiation focused by a lens on an optical fiber and a receiver device to receive a light radiation transmitted by said optical fiber and reflected towards the receiver device by a separating plate, wherein said optical coupler comprises means for the deflection of the light rays, so that the optical axis of the transmitter device is deflected with respect to the optical axis of the optical fiber and of the focusing lens.

BRIEF DESCRIPTION OF THE DRAWING

The invention will be understood more clearly from the detailed description, that now follows, of an exemplary application, made with reference to the appended figures, of which.

MORE DETAILED DESCRIPTION

The particular features of the invention will be emerge more clearly, following a description given by way of a reminder, of insufficient isolation based on an example from the prior art.

Figure 1:
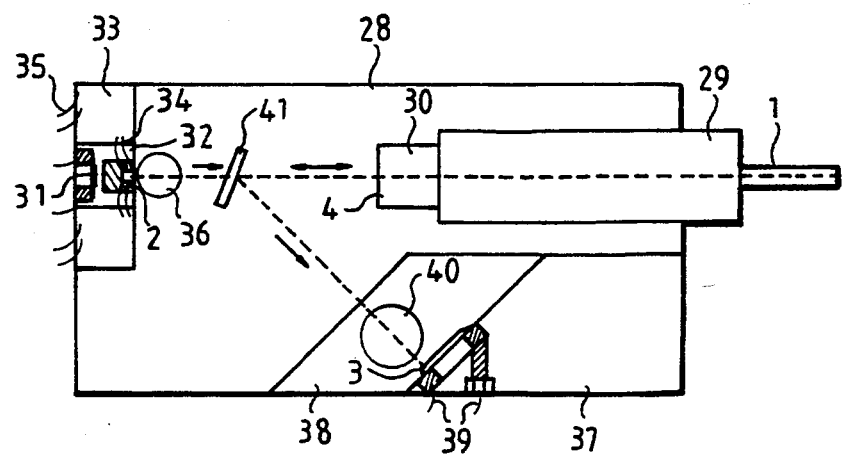
FIG. 1 shows a plane view of a prior art optoelectronic coupler.

FIG. 1 shows a diagram of the layout of an optical coupler described in the above-mentioned patent application. The same reference numbers have been kept.

All the components of this coupler are fixed to the substrate 28 which is used as a reference plane. A tube 29 is fixed to this plane 28; it is preferably metallic, with a length of the order of 1 to 2 cm, and an internal diameter that enables it to receive, firstly, the optical fiber 1 and, secondly, a focusing optical fiber 30, such as an ordinary lens or a lens with index variation or index gradient.

In the optical axis of the fiber 1, there is a first optoelectronic transmitter unit: a laser 2. This laser 2 and its feedback photodiode 31 are fixed to an insulator plate 32, provided with appropriate metallizations for the fastening and the electrical supply, this insulator plate 32 being itself fixed to a first base or pedestal 33 which is generally metallic. The total height of the insulator 32 and of the base 33 is such that the optical axis of the laser 2 is very substantially merged with the optical axis of the fiber 1. Gold and or aluminium wires 34 and 35 provide for the electrical biasing of the laser 2 and of the diode 31, interconnected with an external hybrid circuit.

In order to focus the light sent out by the laser 2 on the optical fiber 1, a first lens 36 is positioned between the laser and the lens 30. The lens 36 is constituted by a spherical bead made of glass or sapphire, and its diameter of about 1.5 mm corresponds to an efficient alignment of the optical laser 2 and the fiber 1 when the bead 36 is bonded directly to the substrate 28 which serves as a reference plane.

A second optoelectronic unit such as a detection photodiode 3 is positioned laterally with respect to the tube 29 and to the optic fiber 1. In a manner comparable to that of the laser 2, the photodiode 3 is fixed to an insulator support 37, provided with appropriate metallizations for the biasing, this support being itself fixed to a second metal base 38. Gold or aluminium threads 39 convey the current for the biasing of the photodiode, in connection with the external hybrid circuit. A second spherical lens 40, made of glass or sapphire, with a diameter of the order of 2 mm, is bonded to the metal base 38, facing the photodiode 3.

The light beam sent out by the laser 2 is directly focused by the lenses 36 and 30 on the optical fiber 1. However, the light beam transmitted by the optical fiber (coming from an optical source located at the other end of the optical fiber) has to be deflected to reach the photodiode 3. To achieve this aim, a plate 41 forming an two-way mirror is placed on the optical axis of the fiber 1, between the lenses 30 and 36.

It is noteworthy that the laser 2 sends out an optical beam in the axis of the optical fiber 1, in accordance with the rectilinear propagation of light. This leads, consequently, to the situation wherein the light beam falls perpendicularly on the optical diopter 4 formed by the input surface of the lens 30 and the ambient air. Owing to the great difference in index between the air and the glass of the lens, a large proportion of the light beam is reflected perpendicularly by this diopter, and this radiation reflected along the same path as the incident beam then encounters the plate 41. A part of the reflected radiation goes through the plate 41 and falls on the laser 2, without any other consequence. However, another part of the radiation is reflected a second time by the plate 41 and falls on the photodiode 3: this coupler therefore parasitically detects the signals that it sends out, in addition to the signals that it receives normally through the optical fiber 1.

This is the main cause of the poor isolation, for the same mechanism can be applied to the second diopter formed by the lens 30 and the fiber 1. Furthermore, a part of the beam sent out by the laser 2 can get scattered at the output of the plate 41, and directly reaches the photodiode 3.

The invention provides an approach to this problem of optical isolation by modifying the structure of the coupler, in such a way that the optical axis of the fiber 1 is no longer merged with the optical axis of the beam sent out by the laser: the break between these two optical axes takes place between the separating plate 41 and the lens 30. Thus, a light ray sent out by the laser falls on the focusing system at an angle different from 90°, and the reflected part no longer follows the same path as the reflected ray, hence it no longer strikes the photodiode 3, inasmuch as it no longer returns to the separating plate 41.

Figure 2:
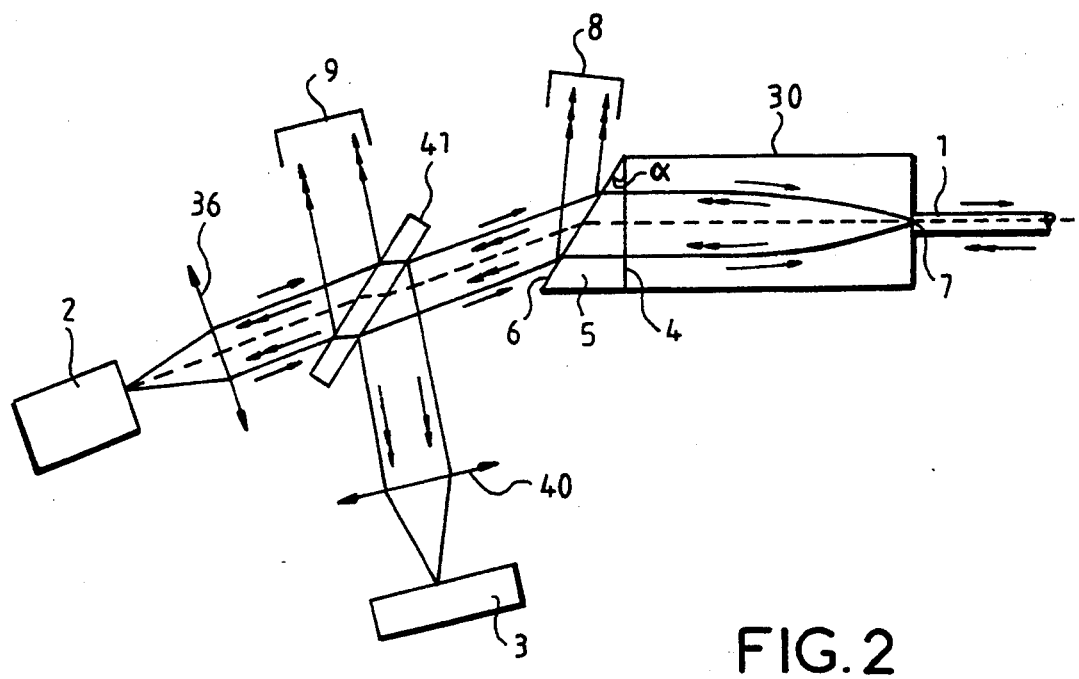
FIG. 2 shows an optical diagram of an optoelectronic coupler according to the invention.

FIG. 2 shows an optical diagram of a coupler according to the invention: the figure shows only the objects needed to understand the invention, and these objects are given the same references as those of FIG. 1 when they are common objects.

The comparison with FIG. 1 brings out the presence of a prism 5 that is bonded to the diopter 4 of the lens 30 with an index gradient, i.e. bonded to that face of this lens which is opposite the face to which the optical fiber 1 is bonded.

This prism 5 is cut from glass or any other transparent material with a refraction index "n" that is the same as the refraction index of the core of the lens 30.

Thus, the diopter 4 neither deflects nor reflects the light rays since the index is the same on both sides of the diopter, at least in the vicinity of the optical axis that is common to the fiber 1 and to the lens 30. The angle at the apex "α" of the prism is of the order of 10° to 20°, and the prism is positioned so that it deflects the light rays in the plane formed by the optical fiber, the axis of the laser and the axis of the photodiode, as shown in FIG. 2.

The prism is attached to the lens 30 by means of a liquid with an appropriate index, e.g., of the Canada balsam type: the attaching is done at the diopter 4, the result of which is that the reflections at this interface are almost zero.

This is also the case with the diopter 7 formed between the optical fiber 1 and the lens 30 with index gradient: this diopter is moistened by a liquid which eliminates the parasitic reflections.

For an optical signal (represented by a double arrow) that reaches the coupler through the optical fiber 1, there is almost no parasitic reflection on the diopters 7 and 4. The light rays go through the prism and are deflected at its output by the diopter 6 formed by the prism and the air: it is at this level that the break occurs in the optical axis. After reflection on the separating plate 41, the incident rays of this signal are collimated by the lens 40 and fall on the photodiode 3, which converts them into electrical signals transmitted for exploitation.

As the case may be, and depending on the nature of the separating plate 41, a part of the incident signal can get diffracted through the plate 41 and fall on the laser 2. This has no other effect than to constitute a loss which reduces the efficiency of the coupler.

An optical signal (represented by a single-headed arrow) sent by the laser 2 is collimated by the lens 36, and slightly offset by the double diopter of the plate 41, and then falls on the diopter 6 which then constitutes the input face of the prism 5. By construction, the light beam sent out by the laser 2 strikes the diopter 6 of the prism at an angle different from 90°, and the major part of the beam is diffracted according to the laws of optics, then collimated by the lens 30 at the end of the optic fiber 1, which transmits this optical signal. The prism/lens interface, at the level of the diopter 4, brings about no refraction or reflection since the refraction indices are the same.

By contrast, at the input diopter 6, a part (represented by triple-headed arrows) of the optical signal sent out by the laser 2 is reflected, because there remains a diopter between glass and air which have different refraction indices. However, since the angle of incidence of the ray sent out by the laser is different from 90°, the angle of reflection is equal, which means that the reflected beam does not take the same path as the incident beam and does not return to the photodiode 3. The orientation given to the beam reflected by the presence of the prism 5 is such that this reflected beam cannot return to the separating plate 41.

It is preferable to absorb the beam reflected on the diopter 6 of the prism 5 by any appropriate means represented by an absorbent trap 8. Without this precaution, the beam that is reflected for the first time on the diopter 6 can get reflected at other times on the casing of the coupler, or on the faces of neighboring components of a hybrid circuit and can finally fall on the photodiode 3.

Similarly, a part of the light beam sent out by the laser 2 is reflected by the input diopter of the separating plate 41: it is preferable to absorb this reflected beam by means of an absorbent trap 9.

The invention has been described on the basis of the example of a coupler that comprises a laser and a lens with index gradient. The invention remains valid if the laser is replaced by a light-emitting diode and if the lens is of the plano-convex type, the prism 5 being attached to the plane. However, experience shows that the lenses with index gradient having two plane faces at their ends are more efficient.

The invention can be used to achieve a 50% increase in the optical isolation of a coupler: this level of isolation goes from 20 dB without a prism to 30 dB with a prism.

It can be applied to exchanges of data by optoelectronic means.

What is claimed is:

1. An optical coupler with a high degree of isolation, comprising a transmitter device to send out a first light radiation focused by a lens onto a surface of a diopter that is connected to an optical fiber, and a receiver device to receive a second light radiation transmitted from said optical fiber through the diopter and then along a first path towards a separating plate and then reflected towards the receiver device by the separating plate, wherein said optical coupler comprises means for the deflection of the first light radiation which is reflected by the surface of the diopter, thereby deflecting the reflected portion of the first light radiation away from the first path, wherein the reflected portion of the first light is not received by the receiver device.

2. An optical coupler according to claim 1, wherein the transmitter device is a semiconductor laser, and the receiver device is a photodiode.

3. An optical coupler with a high degree of isolation, comprising:
   a transmitter device to send out a light radiation focused by a lens on an optical fiber, and a receiver device to receive a light radiation transmitted by said optical fiber and reflected towards the receiver device by a separating plate, wherein said optical coupler comprises means for the deflection of the light rays, so that the optical axis of the transmitter device is deflected with respect to the optical axis of the optical fiber and of the focusing lens; and
   wherein said deflection means are a prism, a first face of which is attached to the input diopter of the focusing lens and a second face of which forms a diopter with the air.

4. An optical coupler according to claim 3, wherein the light rays sent out by the transmitter device go through the separating plate and fall on the diopter of the second face of the prism at an angle different from 90°, and wherein the reflected part of these light rays have an optical path different from that of the incident rays and do not return to the separating plate.

5. An optical coupler according to claim 4, wherein the part of the incident rays that is reflected by the diopter formed by the prism and the air is absorbed by a trap.

6. An optical coupler according to claim 4, wherein the part of the incident rays that is reflected by the separating plate is absorbed by a trap.

7. An optical coupler according to claim 3, wherein the prism has an angle of 10° to 20° and is cut from a transparent material with a refraction index equal to that of the focusing lens in the region of its optical axis.

8. An optical coupler according to claim 3, wherein the focusing lens is preferably a lens with an index gradient, the two ends of which are plane diopters.

9. A coupler according to claim 8, wherein the prism is attached to the input diopter of the focusing lens by means of a liquid with the same refraction index.

10. An optical coupler, comprising:
   a light source for producing first light radiation;
   a means for focussing light radiation, said means for focussing positioned to focus the first light radiation emitted by the light source;
   an optical fiber means having first and second ends, for receiving light into and transmitting light out of both the first and second ends, and for transmitting light between the first and second ends, wherein said optical fiber means, said means for focussing, and said light source are positioned relative to one another so that the first light radiation from the light source that is focussed by the means for focussing is focussed onto the first end of the optical fiber means so that a first fraction of the first light radiation is transmitted into the first end of the optical fiber means and a second fraction of the light radiation is reflected by the first end of the optical fiber means;
   an optical detector for detecting second light radiation that is transmitted through the optical fiber means from the second end toward the first end and is transmitted out of the first end;
   a separating plate that is disposed between the optical fiber means and the light source so that first light radiation that is produced by the light source passes through the separating plate before entering the optical fiber means and so that the second light radiation that is transmitted out of the first end of the optical fiber means impinges upon the separating plate, wherein a fraction of the second light radiation is reflected by the separating plate and is thereby directed towards the optical detector;
   wherein said first end comprises means for reflection of the second fraction of the first light radiation; and
   wherein a path of the second fraction of the first light radiation is different from a path of the second light radiation that is transmitted out of the first end so that the second fraction of the first light radiation is not directed towards the optical detector and any of the second fraction of the first light radiation that is reflected by the seperating plate is not directed towards the optical detector.

11. An optical coupler according to claim 10, wherein the means for reflection comprises a prism having a first face which is attached to an input diopter of a focusing lens and a second face which forms a diopter with air.

12. An optical coupler, comprising:
   a light source for producing first light radiation;
   an optical fiber having first and second ends, said optical fiber and said light source being positioned relative to one another so that the first light radiation from the light source is coupled into the first end of the optical fiber so that a first fraction of the first light radiation is transmitted into the optical fiber;
   an optical detector positioned to detect a fraction of second light radiation that is transmitted through the optical fiber from the second end toward the first end and is transmitted out of the first end;
   a separating plate that is disposed between the optical fiber and the light source so that first light radiation that is produced by the light source passes through the separating plate before entering the optical fiber and so that the fraction of the second light radiation that is transmitted out of the first end of the optical fiber is reflected by the separating plate and thereby directed towards the optical detector; and means for reflection of a second fraction of the first light radiation that is not coupled into the optical fiber but is instead reflected by an interface between two dielectric media which have different indices of optical refraction, said interface coupling the first fraction of the first light radiation to the optical fiber, said means for reflection disposed between the optical fiber and the separating plate, wherein a path of the second fraction of the first light radiation that is reflected by said means for reflection is different from a path of the second light radiation that is transmitted out of the first end of the optical fiber, wherein the second fraction of light does not get directed towards the optical detector.

* * * * *